United States Patent [19]

Shaw et al.

[11] Patent Number: 5,276,436
[45] Date of Patent: * Jan. 4, 1994

[54] TELEVISION SIGNAL PROJECTION SYSTEM AND METHOD OF USING SAME

[75] Inventors: Robert W. Shaw, Escondido; Randall S. Farwell, San Diego; Leonid Shapiro, Lakeside; Lane T. Hauck, San Diego, all of Calif.

[73] Assignee: Proxima Corporation, San Diego, Calif.

[*] Notice: The portion of the term of this patent subsequent to Jul. 6, 2010 has been disclaimed.

[21] Appl. No.: 616,178

[22] Filed: Nov. 19, 1990

Related U.S. Application Data

[63] Continuation-in-part of Ser. No. 586,506, Sep. 21, 1990, Pat. No. 5,225,875, which is a continuation-in-part of Ser. No. 546,238, Jun. 29, 1990, abandoned, which is a continuation-in-part of Ser. No. 506,429, Apr. 9, 1990, abandoned, which is a continuation-in-part of Ser. No. 506,621, Apr. 9, 1990, which is a continuation-in-part of Ser. No. 472,668, Jan. 30, 1990, abandoned, and a continuation-in-part of Ser. No. 222,144, Jul. 21, 1988, abandoned, and a continuation of Ser. No. 507,630, Apr. 11, 1990, Pat. No. 5,062,001.

[51] Int. Cl.[5] ............................... G09G 3/36
[52] U.S. Cl. ..................... 340/703; 340/784
[58] Field of Search ............... 340/701, 703, 717, 720, 340/765, 784, 793, 805, 811, 813, 814; 358/11, 21; 395/100, 118; 359/54, 58, 59

[56] References Cited

U.S. PATENT DOCUMENTS

| | | | |
|---|---|---|---|
| 4,531,160 | 7/1985 | Ehn | 340/793 |
| 4,536,856 | 8/1985 | Hiroishi | 395/100 |
| 4,631,692 | 12/1986 | Broedner | 340/701 |
| 4,760,387 | 7/1988 | Ishii et al. | 340/717 |
| 4,779,083 | 10/1988 | Ishii et al. | 340/784 |
| 4,827,255 | 5/1989 | Ishii | 340/793 |
| 4,838,654 | 6/1989 | Hamaguchi et al. | 340/784 |
| 4,855,728 | 8/1989 | Mano et al. | 340/805 |
| 4,864,390 | 9/1989 | McKechnie et al. | 358/60 |
| 4,886,343 | 12/1989 | Johnson | 340/765 |
| 4,906,071 | 3/1990 | Takahara et al. | 353/122 |
| 4,913,674 | 4/1990 | Nicholas | 445/24 |
| 4,922,240 | 5/1990 | Duwaer | 340/784 |
| 4,931,787 | 6/1990 | Shannon | 340/784 |
| 4,936,656 | 6/1990 | Yamashita et al. | 340/784 |
| 5,062,001 | 10/1991 | Farwell et al. | 340/793 |

Primary Examiner—Richard Hjerpe
Attorney, Agent, or Firm—Bernard L. Kleinke; Jerry R. Potts

[57] ABSTRACT

A multiple color display system employing a high speed display panel adapted for positioning on a conventional photographic projector for displaying large video images. The high speed display panel is coupled to an interface unit for converting conventional NTSC signals into analog signals for driving a controller employing a modulation or duty cycle circuit coupled between the high speed display panel and a memory which is drive by the interface unit. The controller also employs a scan modulator for formatting the NTSC signal so that it may be displayed on a 640 by 480 matrix array employed by the high speed display device. Such a system is modular and employs relatively inexpensive subassembly units such as a user selected television signal generating type device, such as a video cassette recorder, a conventional photographic projector and screen, a high speed color enhancing interface controller and a high speed display device, such as an active matrix display panel adapted for positioning on the stage of the projector.

9 Claims, 11 Drawing Sheets

VERTICAL SYNC MARKERS BEGINNING OF NEW FRAME

VERTICAL SYNC MARKS BEGINNING OF NEW LINE

TELEVISION SIGNAL PROJECTION SYSTEM AND METHOD OF USING SAME

CROSS REFERENCE TO RELATED APPLICATIONS

The present invention is a continuation-in-part of U.S. patent application Ser. No. 07/586,506 filed Sep. 21, 1990, entitled "HIGH SPEED COLOR DISPLAY SYSTEM AND METHOD OF USING SAME, now U.S. Pat. No. 5,225,875, which is a continuation-in-part of U.S. patent application Ser. No. 07/546,238 filed Jun. 29, 1990 entitled "STACKED DISPLAY PANEL CONSTRUCTION AND METHOD OF MAKING SAME,"now abandoned, which is a continuation-in-part of U.S. patent application Ser. No. 07/506,429 filed Apr. 9, 1990, entitled "STACKED DISPLAY PANEL CONSTRUCTION AND METHOD OF MAKING SAME," now abandoned, which is a continuation-in-part and of U.S. patent application Ser. No. 07/506,621 filed Apr. 9, 1990, entitled "STACKED DISPLAY PANEL CONSTRUCTION AND METHOD OF MAKING SAME," which are continuation-in-parts of U.S. patent application Ser. No. 07/472,668 filed Jan. 30, 1990 entitled, "LIQUID CRYSTAL DISPLAY PANEL SYSTEM AND METHOD OF USING SAME," now abandoned, of U.S. patent application Ser. No. 07/222,144 filed Jul. 21, 1988, entitled "GRAY SCALE SYSTEM FOR VISUAL DISPLAYS," now abandoned, and a continuation patent application Ser. No. 07/507,630 filed Apr. 11, 1990 "GRAY SCALE SYSTEM FOR VISUAL DISPLAYS", now U.S. Pat. No. 5,062,001. The foregoing patent applications are incorporated herein by reference.

TECHNICAL FIELD

The present invention relates in general to a video display system, and a method of using it. The invention more particularly relates to a method and apparatus for displaying a large projected full color display image generated from a television video signal.

BACKGROUND ART

There have been various different types and kinds of full color video display systems. Inventive techniques for producing such a full-color display include the use of direct view video or television monitors.

While such techniques have been satisfactory for some applications direct video and television monitors have generally limited with respect to the size of the viewed video image, due to the limited screen area associated with the cathode ray tube employed by such monitor units. Moreover, such systems have been relatively expensive to manufacture, as a result of the cost associated with the direct view video monitors.

Therefore, it would be highly desirable to have a new and improved full-color display system that can produce for a user or audience a large television image, without employing an expensive direct view television monitor.

One attempt to over come the problem of having a limited viewing area has been to employ a rear view projection system where a television signal is converted into its component color parts of red, green and blue to drive a set of red, green and blue lights which are projected onto the rear side of a large transparent screen for viewing purposes. While this technique has proven to be satisfactory for some applications, it has proven to be relatively expensive and requires a large cumbersome display unit cabinet which is difficult to move from place to place. In addition, the brightness of the viewed images is somewhat impaired because of the loss of light in traversing the transparent screen.

Therefore, it would be highly desirable to have a new and improved video display system for displaying large color images produced from a television signal which would be relatively inexpensive and that would not be difficult to move from place to place for viewing purposes.

Another attempt to overcome the problem associated with poor luminance in a large screen viewing system, has been to employ a direct front projection system. The direct projection system is similar to the rear view system except that the red, green and blue lights are projected onto the front surface of a large reflective screen from a projection unit disposed in front of the screen. Again, while such a technique has proven satisfactory for some applications, it has not proven entirely satisfactory, since the projection unit has typically been mounted in a permanent location relative to the screen, for proper focusing and to assure that a sufficient amount of light is projected onto the screen to provide an image with sufficient brightness for viewing purposes.

Therefore, it would be highly desirable to have a new and improved video display system, which could produce large screen viewing images having a relatively high luminance level and which would not be required to be permanently mounted or otherwise positioned.

DISCLOSURE OF INVENTION

Therefore, the principal object of the present invention is to provide a new and improved video display system and method of using it to produce large displayable images generated from conventional television signals.

Another object of the present image is to provide a new and improved video display system that is relatively inexpensive to manufacture and which is easily transmitted for convenient viewing purposes.

Still yet another object of the present invention is to provide a new and improved video display system which produces a video image having a relatively high luminance level where the luminance level is directly related to the size of the displayed image.

Briefly, the above and further objects of the present invention are realized by providing a multiple color display system employing a high speed display panel adapted for positioning on a conventional photographic projector for displaying large video images. The high speed display panel is coupled to an interface unit for converting conventional television video signals into analog signals for driving a controller employing a modulation or duty cycle circuit coupled between the high speed display panel and a memory storage device which is driven by the interface unit.

The controller also employs a format timing generator for formatting the television video signal so that it may be displayed in a conventional matrix array, such as a 640 by 480 matrix array, employed by the high speed display device. The system utilizes relatively inexpensive subassembly units, such as a video cassette recorder, a conventional photographic projector and screen, a high speed color enhancing interface controller and a high speed display device, such as an active matrix display panel adapted for positioning on the photographic projector.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
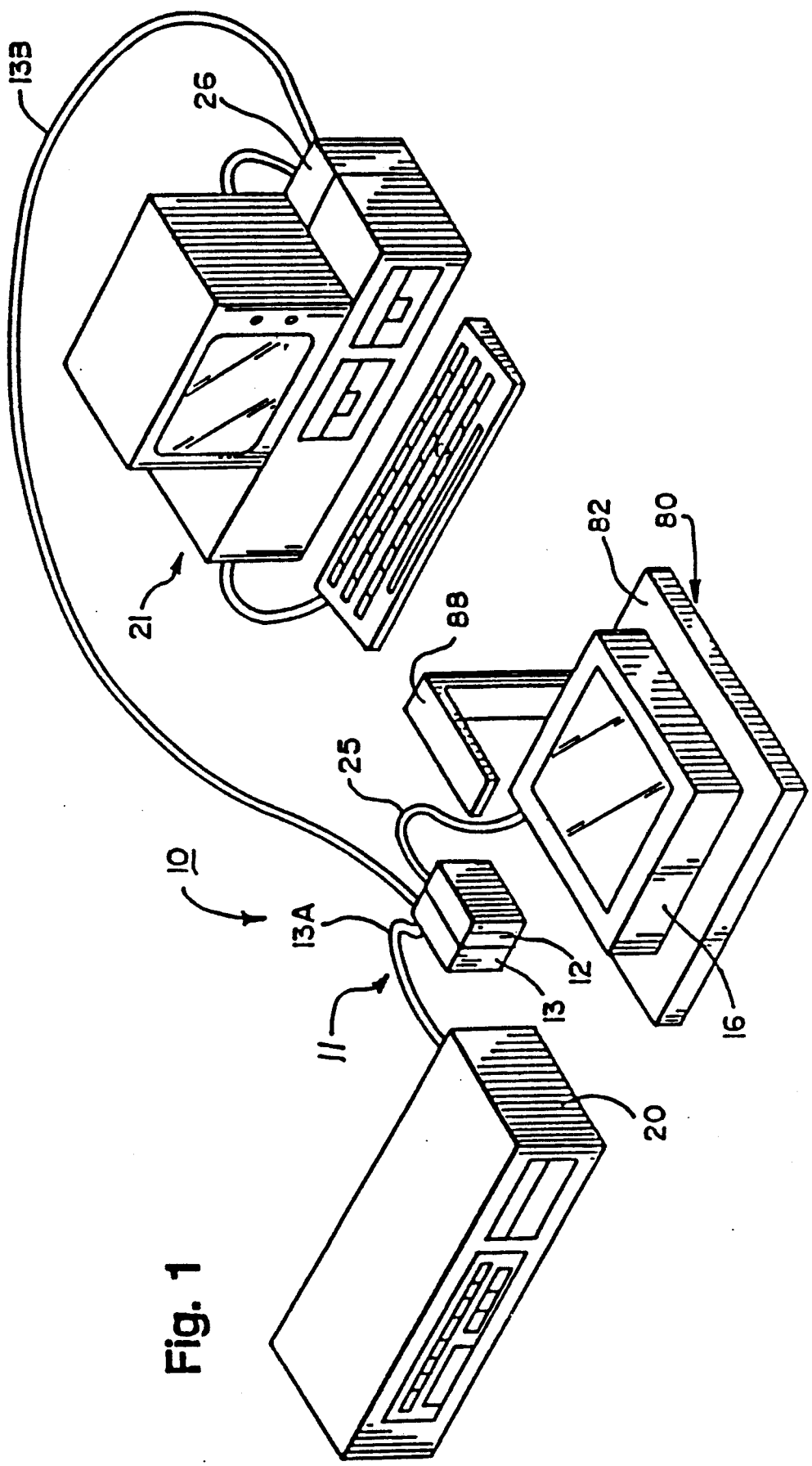
FIG. 1 is a pictorial, partially diagrammatic view of a television projection system, which is constructed in accordance with the present invention, and which is illustrated being employed in a television signal driven, overhead projection arrangement.

Referring to the drawings, and more particularly to FIG. 1, there is illustrated a television signal projection system 10, which is constructed in accordance with the present invention, and which is adapted for use as a video display system capable of displaying a very large full color screen image. Thus, the system 10 is a display projection system, and is employed in an overhead projection arrangement.

As shown in FIG. 1, the system 10 is adapted for use in an arrangement employing a television signal generating source, such as a video cassette recorder 20 with a conventional video cassette (not shown), and an overhead projection system 80. The video cassette recorder 20 supplies a conventional National Television Standards Committee (RF) (NTSC) signal (USA) or a PAL signal (Europe) as generated for displaying an image from a broadcast television signal source. The system 10 generally comprises a high speed display drive unit 11 for translating the conventional television video output signal from the video cassette recorder 20 into high speed video signals capable of hundreds of thousands of different color shadings and hues for display by a high speed display device, such as a thin film transistor active matrix liquid crystal display panel 16 for displaying color images produces from the high speed video signals. The drive unit 11 is also capable of translating the conventional computer video output signals produced by a personal computer 21 having a video drive module 26 as more fully disclosed in copending U.S. patent Ser. No. 07/586,506 mentioned herein. In this regard, the drive unit 11 includes a high speed color enhancing interface controller 12 coupled by an interface unit 13 to either the video cassette recorder 20 or the video drive module 26. The interface unit 13 is connected to the recorder 20 and the module 26 by a pair of cables 13A and 13B respectively.

Figure 3:
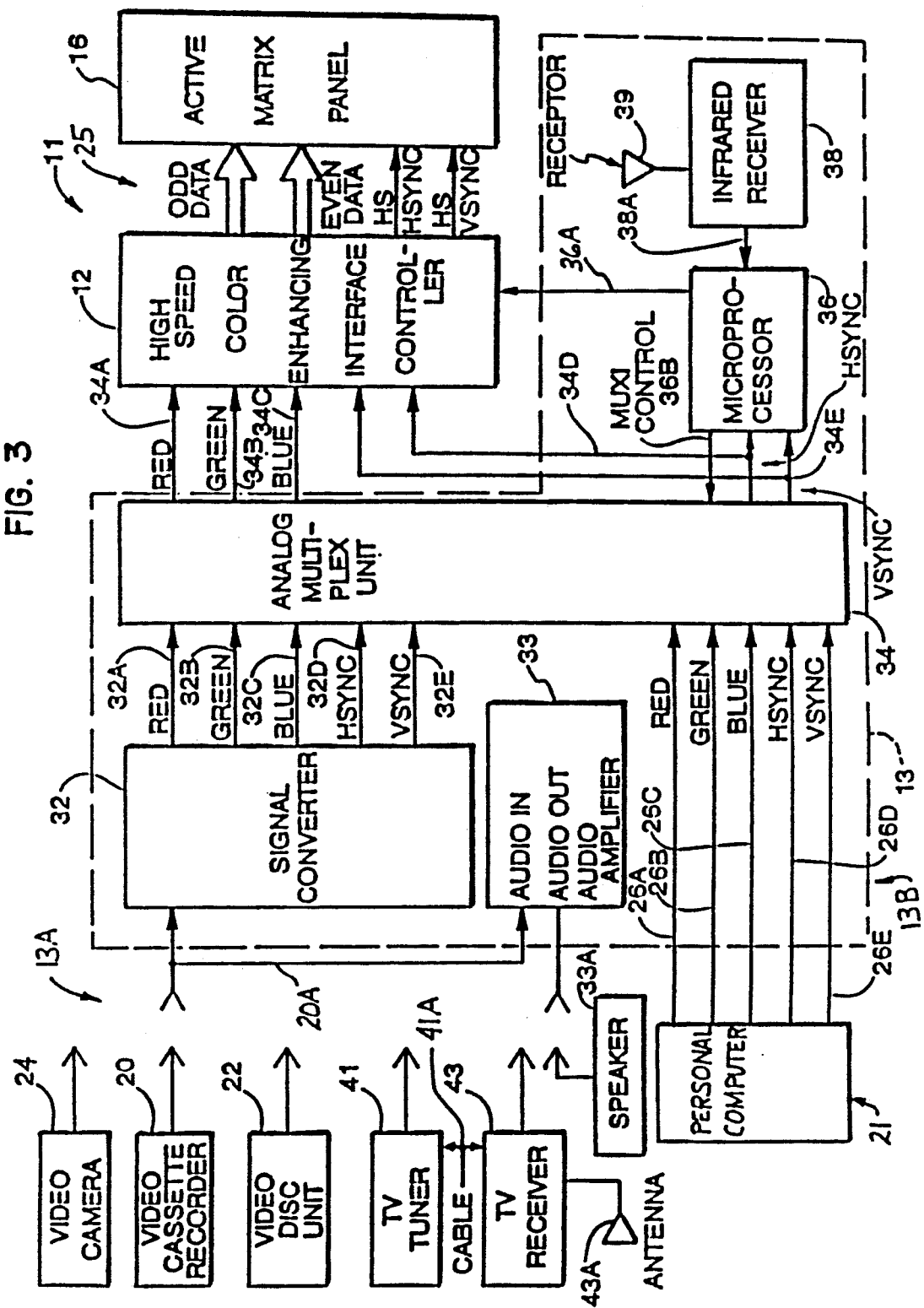
FIG. 3 is a block diagram of a high speed display drive unit of FIG. 1.

Although in the preferred embodiment of the present invention, the drive unit 11 is shown interfaced to the video cassette recorder 20 it will be understood by those skilled in the art that other similar television signal generating sources, such as a video disc unit 22, a video camera 24 a television tuner 41 or a television receiver 43 having an antenna 43A could also be employed as shown in FIG. 3.

The high speed color enhancing interface controller 11 is more fully described in copending U.S. patent application Ser. No. 07/586,506 but includes a format timing generator 45 for formatting the television signal for displaying images on the high speed display device 16.

The interface unit 13 converts the NTSC signal into an analog signal indicative of the red, green, blue color components of the display image along with the horizontal and vertical synchronizing or scanning signals HSYNC and VSYNC for generating a standard television scan raster in which the image is displayed. The high speed color enhancing interface controller 12 not only provides the necessary control functions to couple the interface unit 13 to the high speed display device 16 but also quantizes the conventional RGB analog signal so that a very large number of colors can be displayed by the active matrix panel 16. As best seen in FIG. 1, the high speed color enhancing interface controller 12 is coupled to the active matrix panel by a cable 25.

The video cassette recorder 20 may be any conventional video cassette recorder, such as manufactured by SONY Corporation or RCA, Inc. which is capable of generating a standard NTSC signal when playing a video cassette with prerecorded video television image information. The video cassette recorder 20 can be connected to a CATV cable 41A or a standard television antenna for coupling line broadcast signals to the drive unit 11. The high speed display device 16 in cooperation with the video cassette recorder 20 and the overhead projector system 80 enables a user to view any prerecorded video television image information in a large projected image format.

Figure 2:
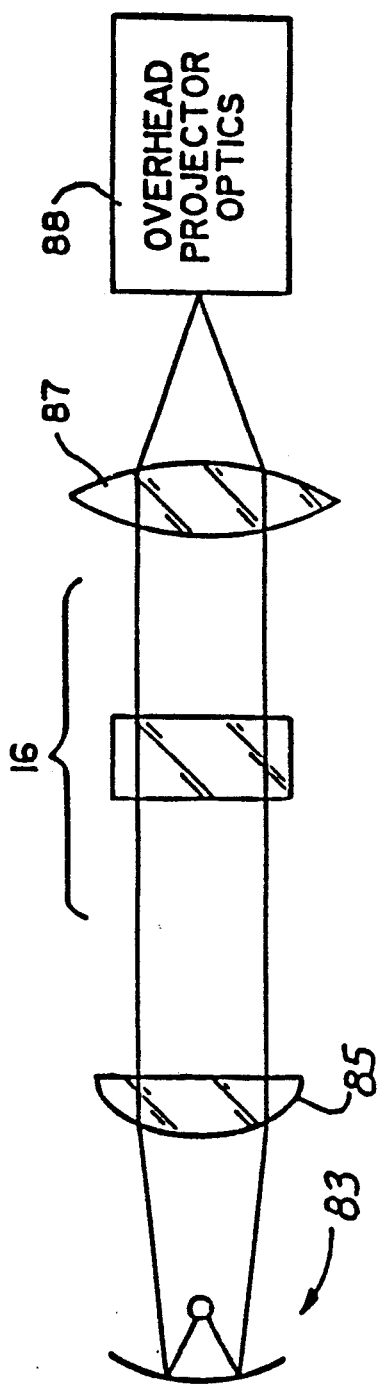
FIG. 2 is a diagrammatic view of the system and the arrangement of FIG. 1.

Considering now the overhead projection device 80 in greater detail with reference to FIGS. 1 and 2, the projection device 80 generally includes a flat transparent projection surface 82 which is adapted to support the active matrix panel 16 for image projection purposes. The overhead projection device 80 includes an illumination bulb and a reflector shown generally at 83 (FIG. 2) for transmitting light through the panel 16.

In order to collimate the light produced by the bulb and reflector 83 into the panel, a collimating Fresnel lens 85 is disposed on the underside of the active matrix panel 16. A focusing lens 87, preferably a Fresnel lens is disposed on the upper side of the panel 16 for converging the light exiting the panel 16 into an overhead projection optics assembly 88. In this regard the optics assembly 88 enables light passing through the panel 16 to be focused onto a projection screen or other suitable viewing surface (not shown), for audience display purposes.

While in the preferred form of the present invention the Fresnel lens 85 and 87 are disposed on the panel 16, it will be understood by those skilled in the art that the lens may be disposed in a case (not shown) for supporting the lens 85 and 87 in a spaced-apart manner from the panel 16. In this regard, the television signal projection system 10 and the method of using it, enables a full color display image to be projected on to any suitable viewing surface in a relatively easy and convenient manner using relatively inexpensive commercially available equipment which may be easily set up for viewing purposes.

The active matrix thin film transistor liquid crystal panel 16 includes a pixel matrix array for generating a selected number of image elements in a 640 by 480 pixel array having a primary color arrangement (red, green, blue) for forming the prerecorded television video image stored on the video cassette cartridge (not shown). It will be understood by those skilled in the art that the television video image may be generated from a television signal which is broadcast and received by a television receiver or generated by a television camera directly coupled to the interface unit 13 as shown in FIG. 3. The active matrix panel 16 is more fully described in copending U.S. patent application Ser. No. 07/586,506 referenced herein.

TABLE I

| Type of Video Signal | Video Signal Source HSYNC rate |
|---|---|
| NTSC | 15.750 KHz |
| VGA Graphics | 31.47 KHz |

As best seen in FIGS. 1 and 3, the system 10 is adapted for use with any conventional television signal source for producing a video image, such as the NTSC and VGA GRAPHIC signals. Table I specifies the HSYNC rate for two of the conventional video signal sources. As will be explained hereinafter in greater detail, the system 10 converts such signals, into re-formatted signals that are capable of driving the active matrix panel 16 having a 640 by 480 pixel array.

Figure 8:
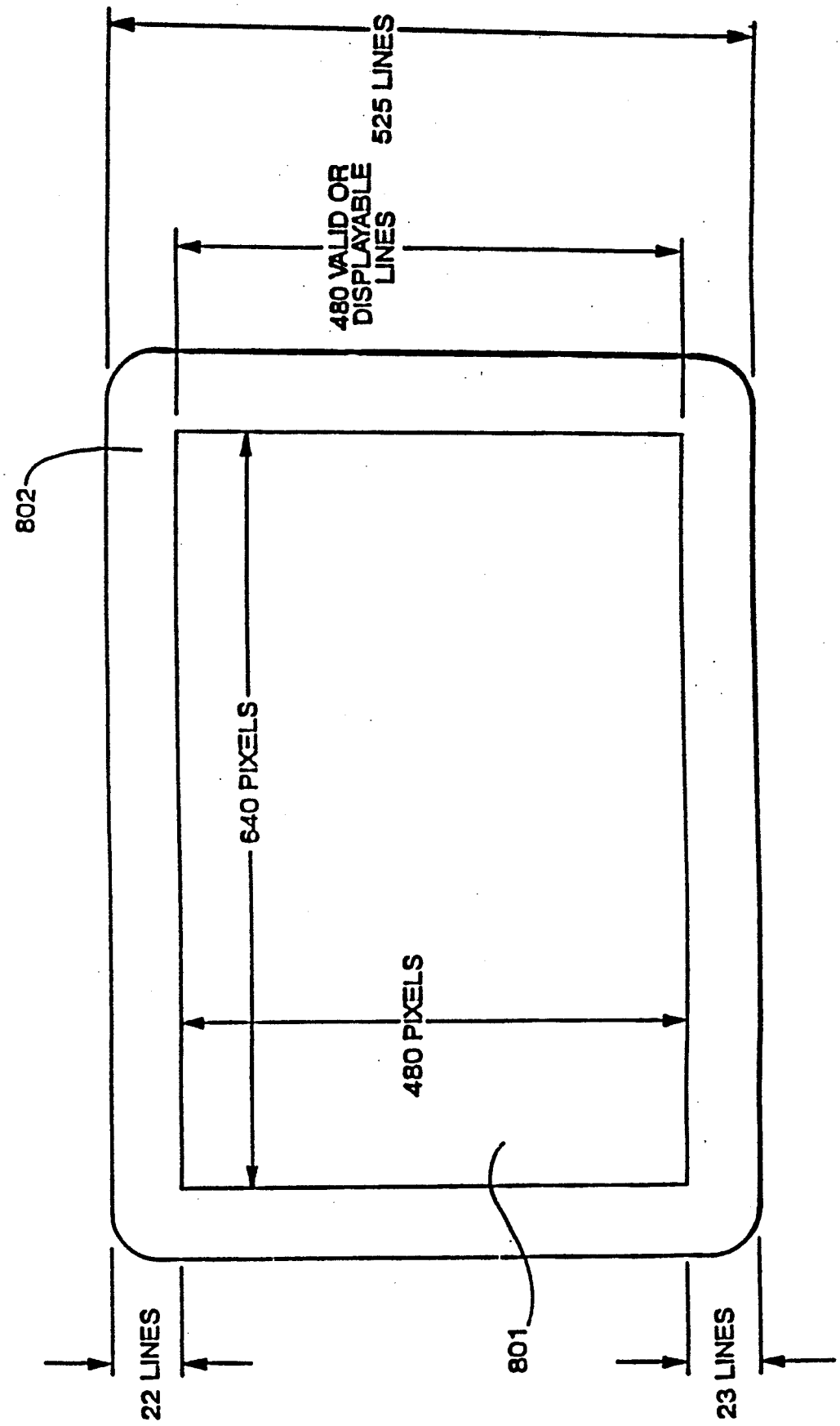
FIG. 8 is a schematic diagram illustrating a matrix array developed by the format timing generator of FIG. 5.

FIG. 8 illustrates a typical display method of the present system 10. In this regard, for illustrative purposes a typical NTSC display format of 525 lines is shown with a 640 by 480 pixel array, shown generally at 801. The NTSC signal occupies a display area shown generally at 802 and consists of two interlaced 60 Hz fields of 262.5 line each, combining to give a 30 Hz, 525 lines of video information. Because the vertical resolution of the panel 16 is less than the vertical resolution provided by the NTSC signal, the present system 10 effectively fits the NTSC display configuration into the 480 lines of vertical resolution for the panel 16. The high speed controller 12 formats the NTSC signal by ignoring the first twenty two horizontal lines and the last twenty three horizontal lines in each frame of video information, resulting in 480 valid or displayable lines (525 lines − 22 lines − 23 lines = 480 lines). This is an effective practice since the disregarded lines consist of the "overscan" (invisible) lines of the extreme top and bottom portions of the displayed image, which typically contains little or no meaningful video information.

The width of the NTSC picture is also matched or formatted into a 640 pixel width for use by the panel 16. In this regard, the controller 12 adjusts the sampling rate of the video signal as will be explained hereinafter in greater detail.

Considering now the interface unit 13 in greater detail with reference to FIG. 3, the interface unit 13 generally includes a signal converter 32 for converting the NTSC television signal from the video cassette recorder 20 into an analog RGB signal suitable for driving the controller 12. The NTSC television signal is coupled to the input of the signal converter 32 by a conductor 20A. As best seen in lo FIG. 3, the interface unit 13 has its input also coupled to the video drive module 26 whose output signals are already in an analog RGB format suitable for driving the controller 12. In this regard, the video drive module 26 in the personal computer 21 has five output signals red, green, blue, horizontal synchronization (HSYNC), and vertical synchronization (VSYNC) coupled to the interface unit 13 on the cable 13B having a set of conductors 26A-E respectively.

In order to enable a user to select between input signals from the video cassette recorder 20 and the video drive module 26, the interface unit 13 also includes an analog multiplex unit 34 and a microprocessor 36. The analog multiplex unit 34 is a conventional multiplexer allowing either the output signals from the signal converter 32 or the output signals from the video drive module 26 to be coupled to the high speed color enhancing interface controller 12. The microprocessor 36 determines which of the video source standards (VGA Graphics, NTSC, PAL, etc.) are to be coupled to the high speed color enhancing interface controller 12. In this regard, the microprocessor 36 allows only one of the source standard signal to be coupled to the controller 12. Signals are coupled from the analog multiplex unit 34 to the high speed controller 12 on a set of conductors 34A-E respectively. Once the microprocessor 36 determines the type of video standard to be supplied to the controller 12, the microprocessor 36 generates appropriate format data and commands on a command-/data line 36A (FIG. 5) for establishing a proper sample rate and format of lines and pixels locations for driving the high speed active matrix unit 16. The microprocessor 36 also generates a control signal (MUX CONTROL) which switches the multiplex unit 34 to receive and pass to the controller 12, either the input signals from the signal converter 32 or the input signals from the video drive module 26. The control signal, MUX CONTROL is coupled to the multiplex unit 34 on a conductor 36B.

The interface unit 13 also includes an infrared receiver 38 having a receptor 39 for receiving infrared signals from a remote infrared transmitter unit (not shown). In this regard, a user may actuate the infrared transmitter unit for generating a signal which causes the microprocessor 36 to search for a different type of video source signal by switching the multiplex unit 34. The infrared receiver 38 is a conventional infrared receiver unit whose output is coupled to the microprocessor 36 on a conductor 38A.

For the purpose of amplifying the low level audio signal that accompanies the video source signals, the interface unit 13 also includes an audio amplifier 33 having an output jack adapted to be connected to a conventional speaker, such as speaker 33A. The audio amplifier 33 is conventional, such as a model TDA1013B sold and manufactured by Signetics and described in the Signetic "Linear Data Manual," Volume 1 (1989) pages 7-207.

Considering now the signal converter 32 in greater detail with reference to FIG. 3, the converter 32 is of a type well known to those skilled in the art, such as a TDA 330 unit manufactured by Motorola and described in the Motorola Linear/Interface Divides Data Book, page 9-183 through 9-190, and in Motorola Application note AN1019D. Other type of converters for converting a PAL signal or a SECAM signal to an RGB signal are also well known. For example a combination PAL-SECAM-NTSC to RGB converter is available from SGS THOMSON at 1000 East Bell Road, Phoenix, Ariz. under part number TEA 5640C as described in the SGS THOMSON Video IC's Data Book, pages 1211-1227. As the signal converter 32 is well known, it will not be described herein in greater detail. The output signals of the signal converter 32 are coupled to the analog multiplex unit 34 on a set of conductors 32A-E carrying the respective signals of red, green, blue, horizontal synchronization (HSYNC) and vertical synchronization (VSYNC).

Figure 4:
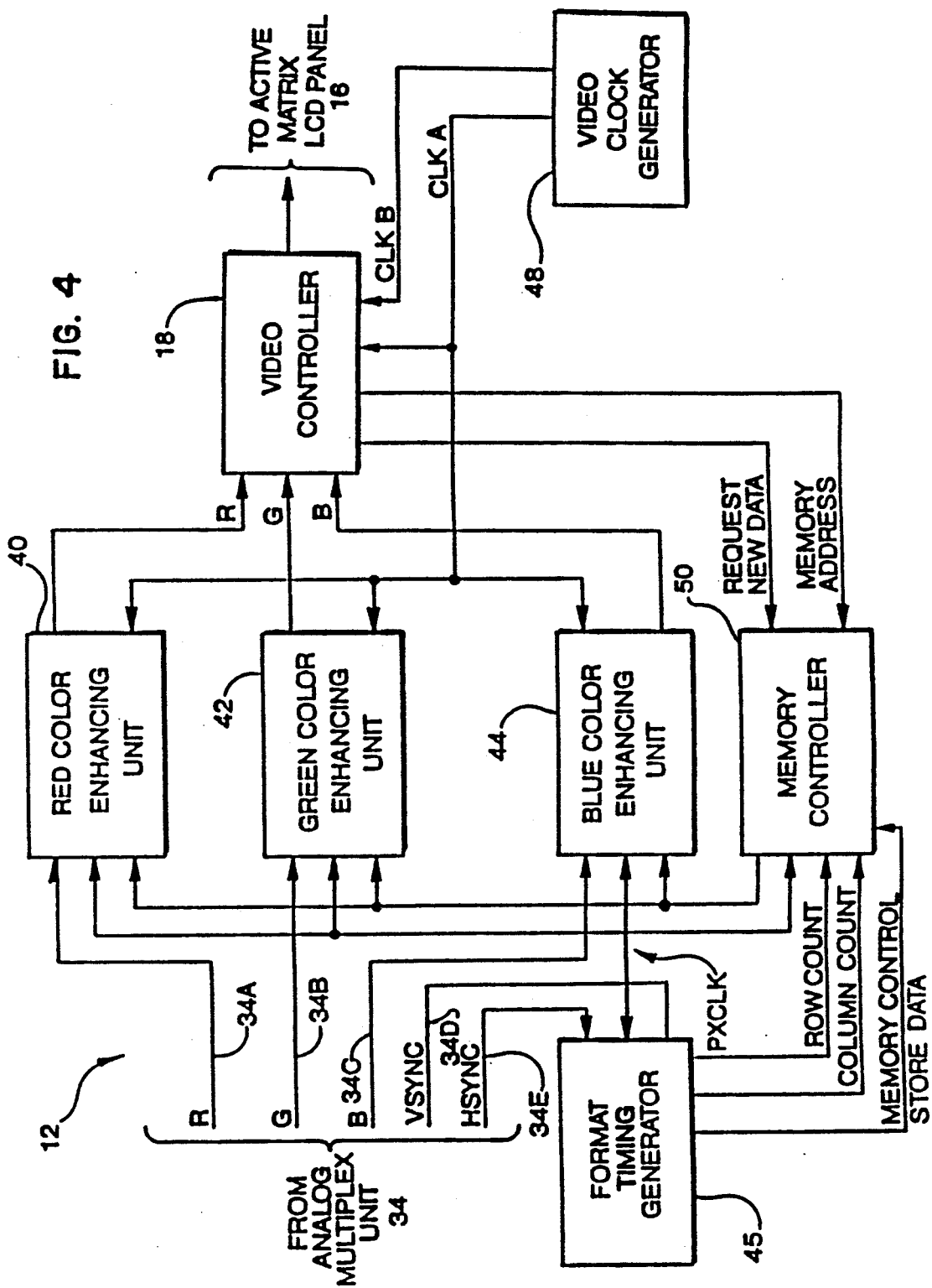
FIG. 4 is a block diagram of a high speed color enhancing interface controller of FIG. 3.

Considering now the high speed color enhancing interface controller 12 in greater detail with reference to FIGS. 3 and 4, the high speed controller 12 is coupled between the active matrix panel 16 via cable 25 and the output of the analog multiplex unit 34. In this regard, the output signals from the analog multiplex unit 34, red, green, blue, horizontal synchronization and (HSYNC) vertical synchronization (VSYNC) are coupled to the input of controller 12 on a set of conductors 34A-E respectively.

The high speed color enhancing interface controller 12 as best seen in FIG. 4, is fully described in copending U.S. patent application Ser. No. 07/586,506 and generally comprises video controller 18, a set of color enhancing units 40, 42, 44, a memory controller 50, a format timing generator 45 and a video clock generator 48. The high speed color enhancing interface controller 12 is substantially identical to the high speed color enhancing controller described in copending U.S. patent application Ser. No. 07/586,506 except that the controller 12 employs the format timing generator 45 instead of a pixel clock generator for formatting the television signal produced by the video cassette recorder 20 into a format that is acceptable for driving the active matrix panel 16. As the high speed controller 12 is substantially similar to the controller described in copending U.S. patent application Ser. No. 07/586,506 only those aspects of the controller 12 that are different such as the format timing generator 45, will be described herein in greater detail.

Figure 5:
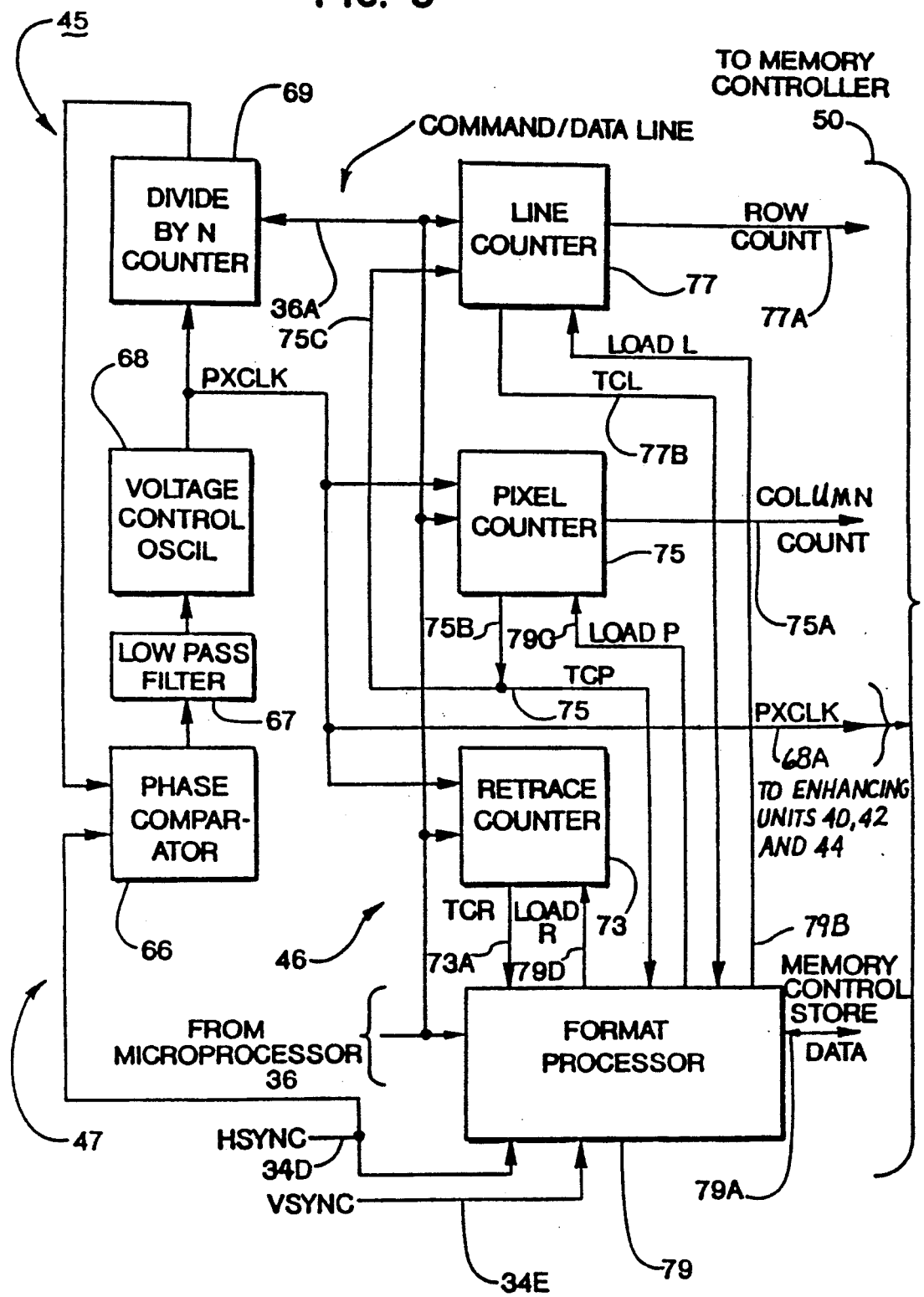
FIG. 5 is a functional block diagram of a format timing generator of the high speed color enhancing interface controller of FIG. 3.

Considering now the format timing generator 45 in greater detail with reference to FIGS. 4 and 5, the format timing generator 45 generally comprises a programmable counter arrangement 46 for helping to format the video data to be stored in the controller 12, and a programmable pixel clock generator 47 for establishing a proper sampling rate based upon the type of video signal being coupled to the controller 12.

As best seen in FIG. 5, the programmable pixel clock generator 47 is a conventional phase lock loop arrangement including a phase comparator 66, a low pass filter 67, a voltage control oscillator 68, and a programmable divider or divide by N counter 69. The programmable pixel clock generator 47 utilizes a reference clock signal coupled from the output of the analog multiplex unit 34. The reference signal is identified by the HSYNC signal and is coupled on a conductor 34D to the input of the phase comparator 66. An output pixel clock signal PXCLK for synchronizing the storing of the video data in the respective enhancing units 40, 42 and 44 is derived from the output of the voltage controlled oscillator 68. The sampling rate of the voltage controlled oscillator 68 is a function of the output of the programmable divider 69 as will be described hereinafter in greater detail.

Considering now the programmable divider 69 in greater detail with reference to FIG. 5, the programmable divider 69 is programmed by the microprocessor 36 to help establish a proper sampling rate for storing the video data. The following example will be instructive. Assuming the video standard coupled to the high speed controller 12 is a NTSC standard requiring a sampling rate of 14.333 MHz or 910 samples for every line of display data. In this regard, a division of 910 is required to produce the desired sampling rate as shown by the following formula:

HSYNC rate (NTSC standard) ≈ 15.750 KHz

Sampling rate = 15.750 KHz × 910 = 14.333 MHz.

As will be explained hereinafter, 910 pixels are sampled per line, however 270 pixels of the 910 pixel samples represent overscan or retrace data and is disregard. In this regard, the first 135 pixel scan locations and the last 135 pixel scan location are disregarded with respect to the video data stored in the controller 12. The non-stored location are referred to as non-valid data.

If the video standard is VGA graphics, for example, a division of 800 is required to produce a sample rate of 25.175 MHz. In this regard, the HSYNC signal is 31.47 KHz multiplied by 800 to produce the desired sampling rate of 25.175 MHz. Again, a given number of the 800 samples represent overscan or retrace data, i.e. 160 samples. These 160 samples are disregarded, the first 80 samples and the last 80 samples in every line.

Figure 9B:
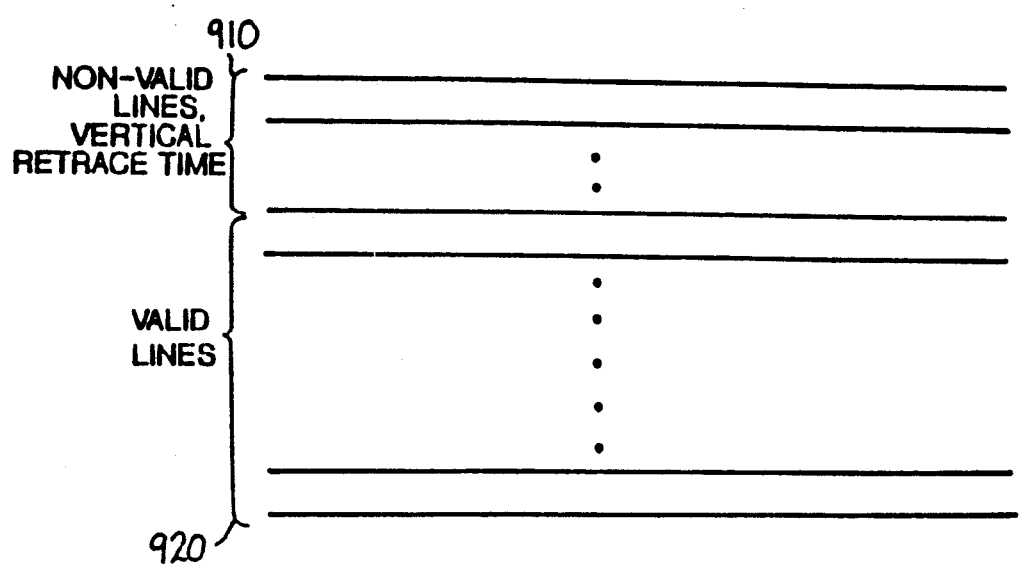
FIG. 9B is a vertical formatting timing diagram for helping to understand the operation of the format timing generator of FIG. 5.
Figure 9A:
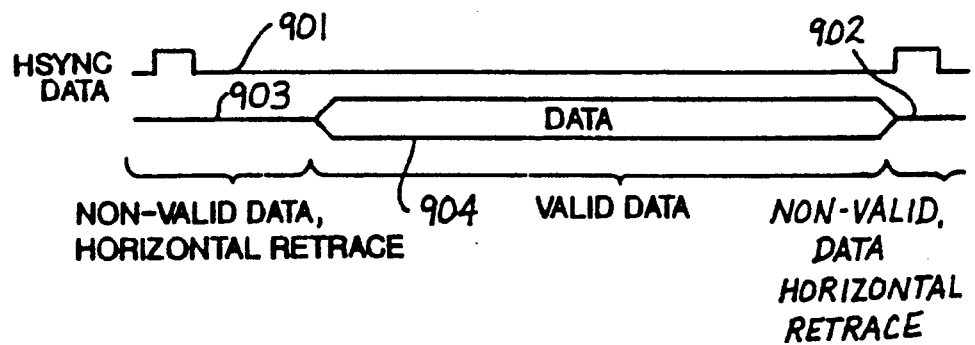
FIG. 9A is a horizontal formatting timing diagram for helping to understand the operation of the format timing generator of FIG. 5.
Figure 10:
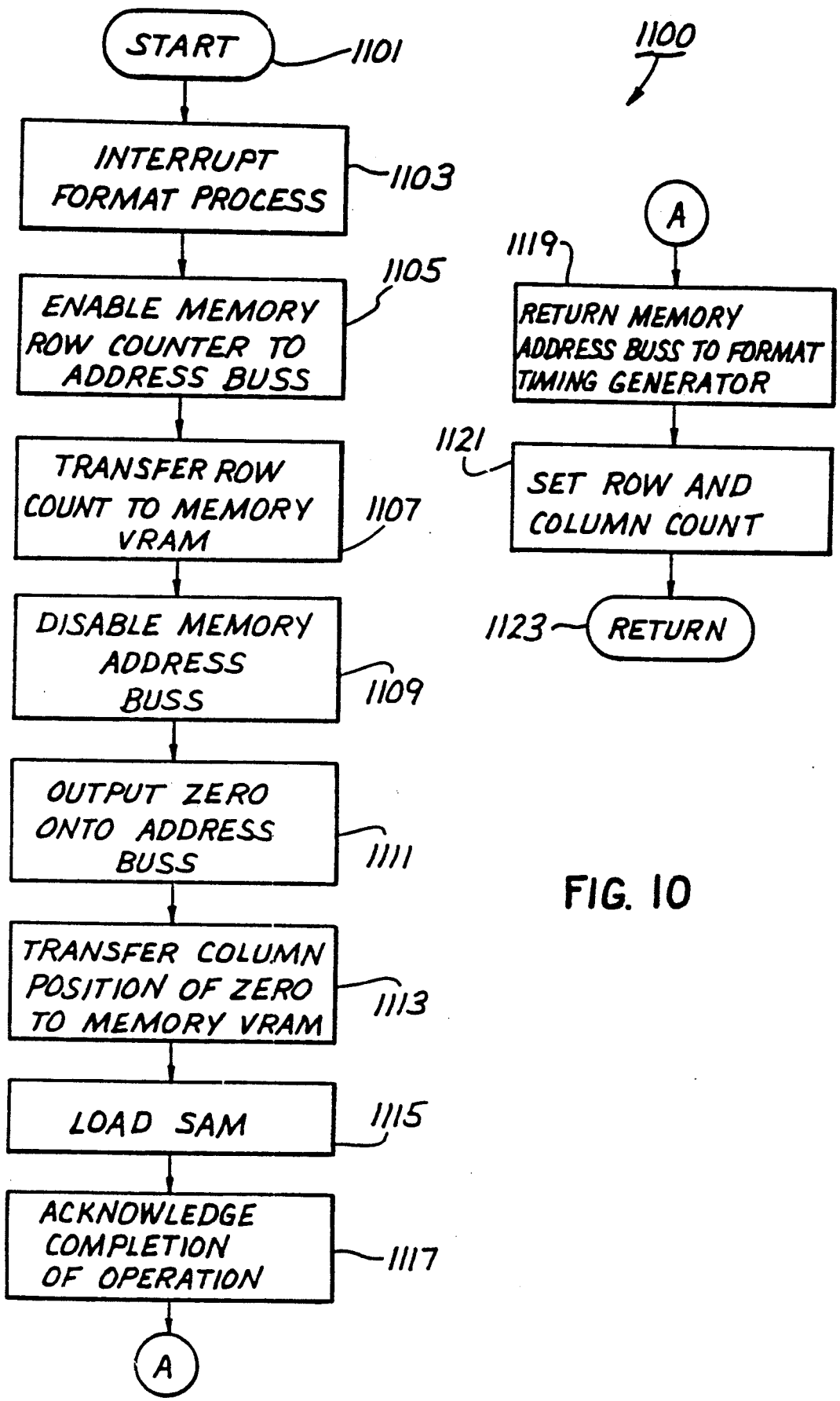
FIG. 10 is a flow chart diagram of the interrupt firmware of the high speed color enhancing controller of FIG. 3.

Referring now to FIG. 9A, a horizontal synchronization signal (HSYNC DATA) is shown generally at 901. The pixel location disregard for storage purposes as described above are shown as a non-valid data group 902 immediately before the HSYNC DATA signal 901 goes to a logical high level and a non-valid data group 903 immediately after the HSYNC DATA signal 901 goes to a logical high level. The pixel locations between groups 902 and 903 represents a valid data group 904 for displaying on the panel 16. For the purpose of further explanation, the HORIZONTAL RETRACE period occurs when the HSYNC DATA signal 901 is a logical high.

Considering now the programmable counter arrangement 46 in greater detail with reference to FIG. 5, the programmable counter arrangement 46 generally comprises a retrace counter 73 for helping to establish the number of vertical retrace lines in a frame of displayed information, a pixel counter 75 for helping to establish the number of valid pixels in a single line of displayed information and for helping to establish the number of horizontal retrace pixels between lines of displayed information, a line counter 77 for helping to establish the number of valid lines in a frame of displayed information and a format processor or controller 79 for helping to coordinate the operation of the above mentioned counters in cooperation with the microprocessor 36.

The format controller 79 under the control of the microprocessor 36 generates load signals LOAD R, LOAD P, and LOAD L which enables the loading of predetermined counts into the retrace counter 73, the pixel counter 75 and the line counter 77 for storing video data in each of the color enhancing units 40, 42 and 44 in a proper format for access and display on the display unit 16. The load signals, LOAD R, LOAD P and LOAD L are connected between the format controller 79 and the retrace counter, pixel counter 75 and line counter 77 on a set of conductors 79D, 79C and 79B respectively. A connector 36A connected between the microprocessor 36, the format controller 79, the programmable divider 69, and each of the above referenced counters 73, 75 and 75 allows command instructions and the predetermined formatting data to be transferred from the microprocessor 36 for establishing proper formatting.

In order to enable the format processor 79 to generate the necessary control signal for enabling the memory controller 50 to store the video information and control memory operations, each of the counters 73, 75 and 75 provide terminal count signals TCR, TCP, and TCL to the format processor 79. The terminal count signals are conducted to the processor 79 on conductors 73A, 75B and 77B respectively. The format processor 79 enables the memory controller 50 to store all even field lines of even memory addresses in the bit map memories and odd field lines at odd memory addresses. Storing video information in this manner, enables the video information to be retrieved from the bit map memories in each respective enhancing unit 40, 42 and 44 in a double scanning line format to generate the 480 vertical line resolution utilized by the high speed display device 16.

In operation, the microprocessor 36 determines what video source is to be displayed and sends the proper divide by command to the programmable divider 69 via a command/data line signal on a conductor 36A. The operation of the microprocessor 36 will now be described in greater detail with reference to the flow diagram of FIG. 6 which illustrates the steps executed by the microprocessor 36.

Figure 6:
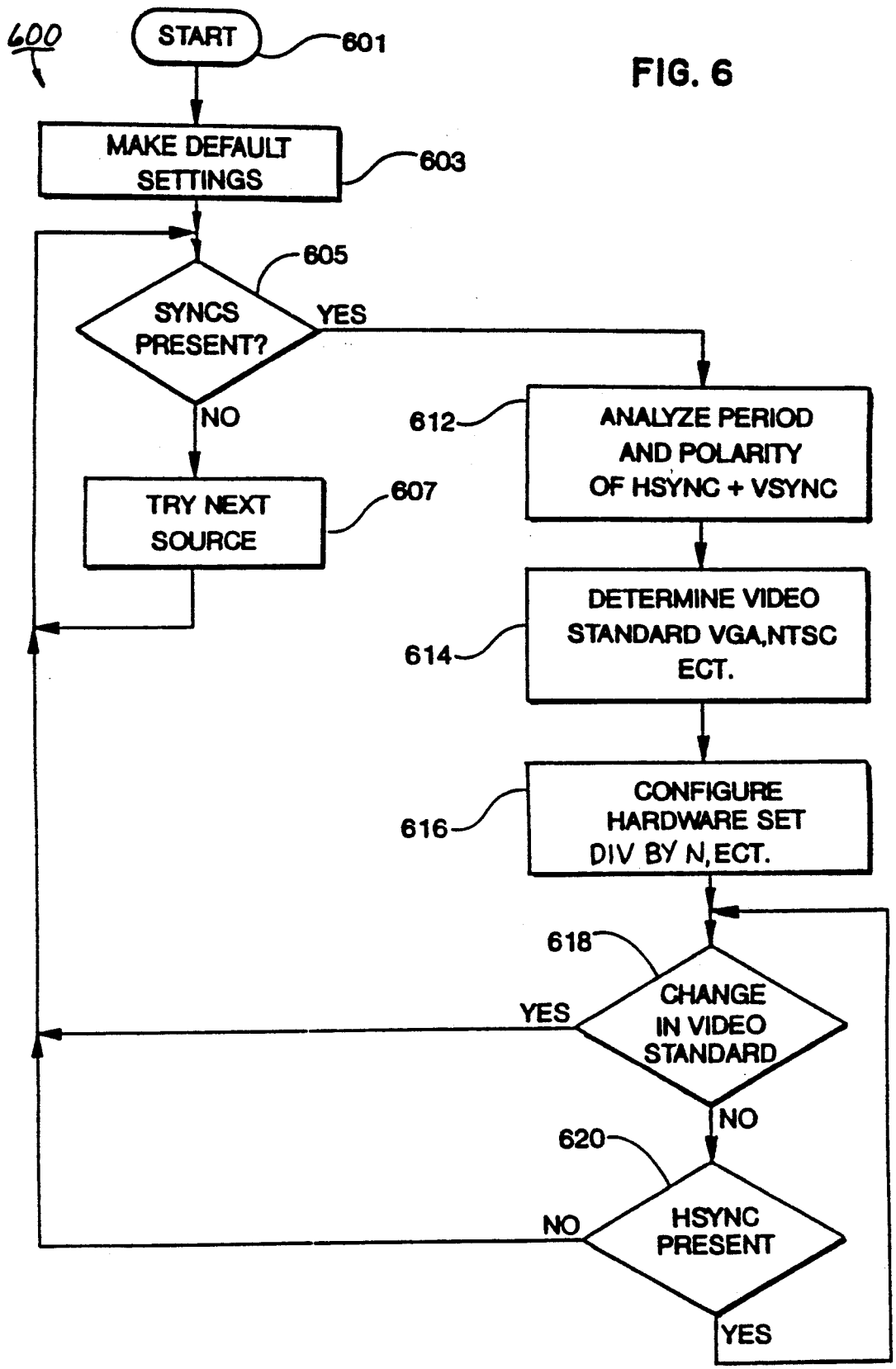
FIG. 6 is a flow diagram of the operation of the microprocessor of the high speed display drive unit of FIG. 1.

Referring now to the flow chart of FIG. 6, when power is applied to the drive unit 11, a CONFIGURE PROGRAM 600 begins in a START instruction 601 and proceeds to an instruction box 603 to set the default settings for the preferred types of video signal source, i.e. NTSC, PAL, VGA GRAPHICS, etc. After the default settings have been established, the program proceeds to a decision instruction 605 in which a determination is made whether the microprocessor is currently receiving an HSYNC signal from the analog multiplex unit 34. If there is no signal being received, the program proceeds to instruction box 607 to cause the analog multiplex control signal MUX CONTROL to be switched allowing the HSYNC and VSYNC signal from another video signal source to be coupled to the microprocessor 36. After the MUX CONTROL signal has been enabled the program returns to decision 605 to once again determine whether an HSYNC is being received from the next selected or enabled source. The above described procedure repeats itself until an enabled video signal source begins sending video synchronization information (HSYNC, VSYNC).

If it is determined at decision instruction 605 that an HSYNC signal is present, the program branches to instruction 612 to cause the microprocessor 36 to analyze the period and polarity of the HSYNC and VSYNC signals respectively. After execution of instruction 612, the program proceeds to instruction 614 where the exact video signal standard is determined by the microprocessor 36 using a conventional comparing technique. Once the video signal standard is determined, the program steps to instruction 616 which configures the programmable divider 69 and programmable counter arrangement 46 by causing the proper sample rate and format count data to be set for formatting purposes. In this regard, the format processor 79 causes the LOAD R signal, LOAD P signal and LOAD L signal each to be enabled, as will be explained hereinafter in greater detail, so that the format data supplied by microprocessor 36 on line 36A can be loaded into each of the counters 73, 75 and 77. Once the programmable divider 69 and programmable counter arrangement 46 has been configured, the program proceeds to decision instruction 618 which determines whether a user has changed the video standard. If the video standard has not been changed, the program waits at instruction 618 until the video source is changed. When the video source is changed, the proceeds to decision instruction 620 to determine whether the HSYNC signal is being received from the video source. If the HSYNC signal is present, the program goes to instruction 612 and proceeds as previously described. If a HSYNC signal is not present, the program will advance from instruction 620 to decision instruction 605 and proceed as previously described.

Figure 7A:
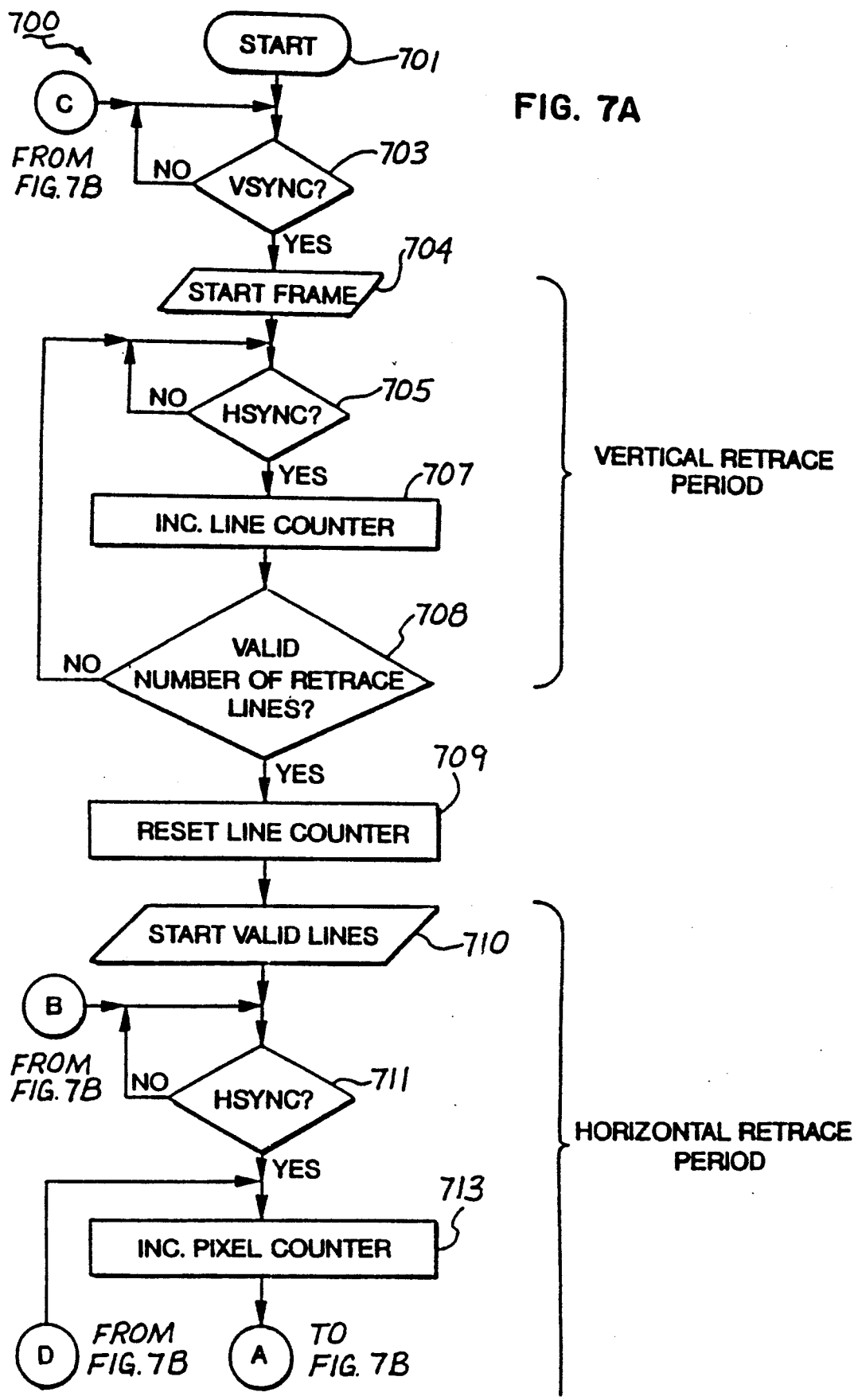
FIGS. 7A-B is a flow chart diagram of the operation of the format processor of the high speed color enhancing controller of FIG. 3.
Figure 7B:
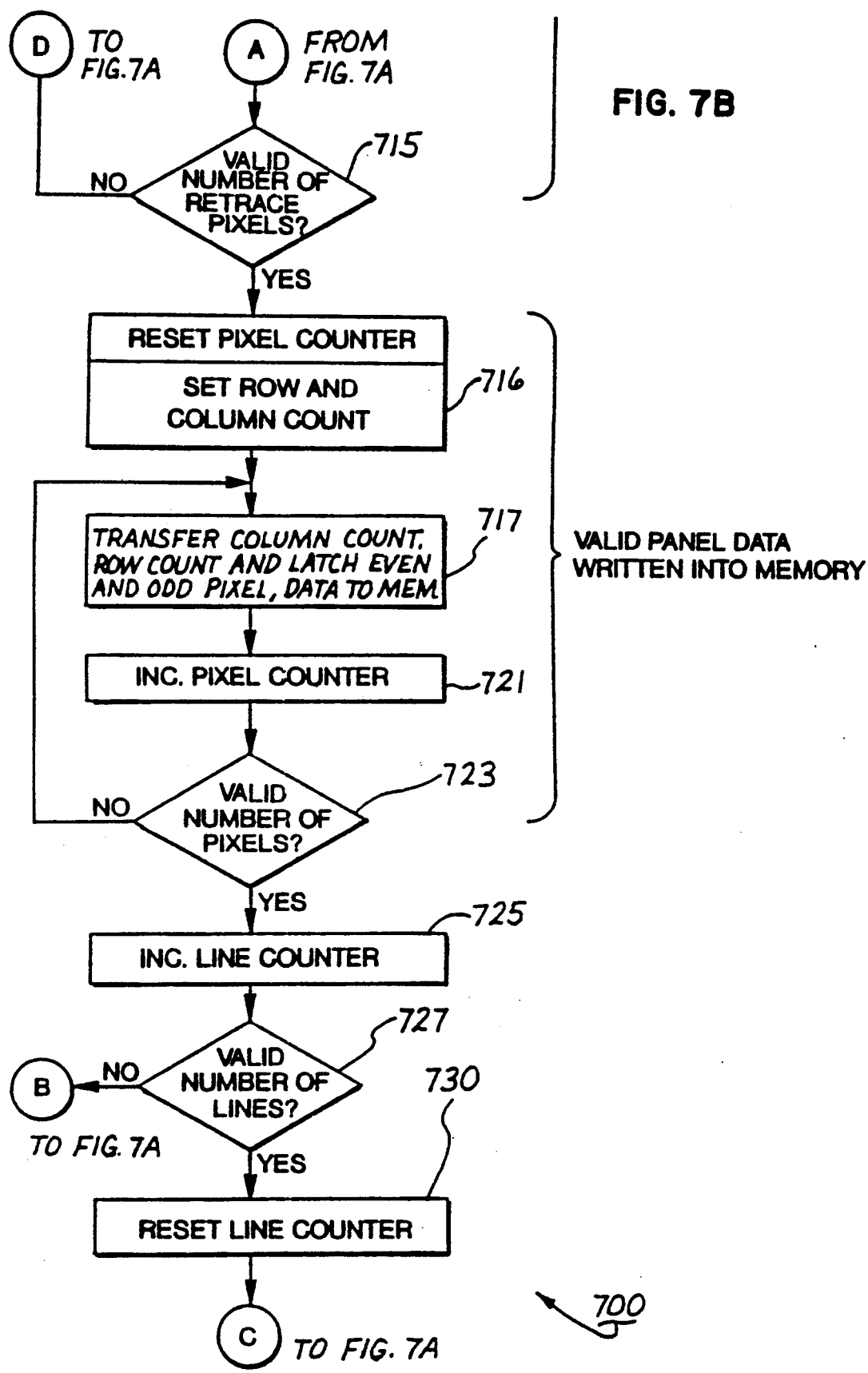

Considering now the operation of the format controller 79 in greater detail with reference to FIG. 7A and 7B, in order for the format controller to properly control the formatting of video data for storage in the various bit map memories in the enhancing units 40, 42 and 44, the microprocessor 36 must first determine (1) the number of vertical retrace lines required for the displayed information; 2) the number of valid or displayable lines in any given frame of displayable information; 3) the number of horizontal retrace pixels between each displayable line of information; and 4) the total number of valid or displayable pixels in each line of displayable information. The microprocessor 36 is preprogrammed to determine the type of video source signal as a function of the HSYNC and VSYNC signal produced by the video source and then to generate the proper counter arrangement 46 data for storing in each of the respective counters 73, 75 and 77 to achieve proper formatting. Table II illustrates the base count information required for converting a VGA and a NTSC video source signal.

TABLE II

| | TYPE OF VIDEO SIGNAL SOURCE | |
|---|---|---|
| COUNT REQUIREMENT | VGA SOURCE | NTSC SOURCE |
| VERTICAL RETRACE LINES/FRAME | 31 | 45 |
| DISPLAYABLE LINES IN FRAME | 480 | 240 |
| HORIZONTAL RETRACE PIXELS | 132 | 192 |
| DISPLAY PIXELS | 320* | 320* |

*represents pixel pairs, and must be multiplied by two for actual number of displayable pixels as display consists of two interlaced 60 Hz fields of 262.5 lines each, combined to give 525 lines of video information.

Once the microprocessor 36 has determined the type of video source signal, the microprocessor 36 sends formatting commands and format data for utilization by the counter arrangement 46.

Referring now to FIG. 7, the format processor 79 upon receiving a configuration or format command starts a FORMAT program 700. The FORMAT program 700 begins in a START instruction 701 and processed to a decision instruction 703 to determine whether a VSYNC signal from the video source is present. If the VSYNC signal is not present, the program waits at decision instruction 703. When the VSYNC signal occurs, the program proceeds to an instruction box 704 to start a vertical retrace period or a new frame by resulting the time counter 77. The program then goes to decision box to determine whether a HSYNC signal is present. If the HSYNC signal is not present the program waits at box 705. When an HSYNC signal occurs the program advances to instruction box 707 to cause the line counter 77 to be incremented. After the line counter 77 has been increment, the program proceeds to a decision instruction 708 to determine whether a valid number of retrace line has occurred. If a valid number of retrace lines has not occurred, the program returns to decision box 705 and proceeds as previously described. In this regard, it should be understood that the first twenty two horizontal lines of data will be disregarded as best seen in FIGS. 8 and 9. If a valid number of retrace lines has occurred, the program advances to instruction 709 to reset the line counter 77. Once the line counter 77 has been reset, the program proceeds to instruction 710 to start a horizontal retrace period for generating the first valid line of the 480 lines to be stored. The program then advances to decision instruction 711 to wait for the next HSYNC signal. If the HSYNC signal is not present, the program waits at decision instruction 711. When the HSYNC signal occurs, the program advances to instruction 713 to increment the pixels counter 75. The program then proceeds, to decision instruction 715 (FIG. 7B) to determine whether a valid number of retrace pixels has occurred. If a valid number of retrace pixels has not occurred, the program returns to instruction 713 (FIG. 7A) and continues as previously described. If a valid number of retrace pixels has occurred, the program advances to instruction 716 to start storing valid video data into the bit map memories of the enhancing units 40, 42 and 44. In this regard, at instruction box 716 the pixel counter 75 is reset and the row and column count is set for utilization by the memory controller 50. After the row and column count has been set, and the pixel counter 75 reset, the program advances to instruction box 717 transfer the row and column count to the memory controller, enables the latching of the even and odd pixels and generates the memory control signals to enable the storing of data into the bit map memories. The control signals (such as the odd enable and even enable signals) for storing data int the individual bit map memories of enhancing units 40, 42, and 44 are more fully described in copending U.S. patent application Ser. No. 07/586,506. As will be explained hereinafter in greater detail, the memory control signals include an interrupt signal when generated by the video controller 18 whenever the video controller 18 requires access to the bit map memories in the enhancing units 40, 42 and 44. In this regard, the Request New Data signal generated by the video controller 18 cause the storing of data via the format timing generator 45 to be temporarily disabled while a line of displayable video data is read from the enhancing units 40, 42 and 44 for display purposes. The interrupt signal from the format timing generator 45 via the memory controller 50 and the memory control store data lines.

After the transfer of the data into memory, the program then proceeds to instruction 721 to increment the pixel counter 75. After the pixel counter 75 has been incremented the program advances to a decision instruction 723 to determine whether a valid number of pixels has been generated by the pixel counter 75. If a valid number has not occurred, the program returns to instruction 717 and repeats the above described sequence. When a valid number of pixels occurs, the program goes from decision instruction 723 to instruction box 725 to increment the line counter 77. After the line counter 77 has been incremented, the program advances to decision instruction 727 to determine whether a valid number of lines has occurred. If the frame is not completed, the program returns to decision instruction 711 (FIG. 7A) to start another line of information as previously described. If the frame is completed, the program goes to instruction 730 and reset the line counter 77. After counter 77 has been reset, the program returns to instruction 703 to wait for the next VSYNC signal.

From the foregoing, it should be understood that the format controller 79 in cooperation with the microprocessor 36 enables a conventional video signal such as a NTSC signal having 525 lines of horizontal video information to be formatted for display into 480 lines of horizontal video information as used by the high speed display device 16. More particularly, the microprocessor 36 and controller 79 cause the 525 lines of horizontal information for each displayable frame of video information to be centered for display in the 640×480 pixel array of panel 16. In this regard, the first twenty two lines of horizontal data are blanked and the last twenty three lines of horizontal data are blanked so that only 480 lines of the horizontal information for each displayable frame of video information is displayed.

This is effective in practice since the majority of the disregarded horizontal lines consists of "overscan" or "invisible" lines and the extreme top and bottom of the displayable frame usually contains little or no displayable video information. For example, referring to FIG. 9B, a timing diagram is illustrated for horizontal line formatting. In this regard, a group of non-valid lines is shown generally at 910 and a group of valid lines are shown generally at 920. The group of non-valid lines 910 are disposed immediately before and immediately after the VSYNC signal goes to a logic high. The first 23 lines before the VSYNC signal and the first 22 lines after the VSYNC signal represent non-valid lines. The VSYNC signal is indicative of the vertical retrace lines. In a similar manner the width of the displayable frame of video information is matched to the 640 lines of the vertical information for each frame by adjusting the sampling rate of the video signal. The sampling or PXCLK rate is set, then a horizontal divisor (ratio of PXCLK to HSYNC rate) is set using the programmable divider 69 to match the horizontal frequency of the television signal produced by the video source. As the signals from the video drive module 26 already have a proper format, the above described formatting technique is not required. In this regard, the microprocessor 36 is coupled to the format timing generator 45 to select the desired format for the video drive module 26.

Considering now the memory controller 50 in greater detail with reference to FIG. 11, the memory controller 50 controls the storing and reading of video data from each of the enhancing units 40, 42 and 44. In this regard, the memory controller 50 is more fully described in copending U.S. patent application Ser. No. 07/586,506 and will not be described hereinafter in greater detail except for the interrupting of the format processor 79 (FIG. 5) via an INTERRUPT firmware program 1100 whenever the bit memories of the enhancing units 40, 42 and 44 are accessed by the video controller 18.

Considering now the video controller 18 in greater detail with reference to FIG. 4, the video controller 18 includes a row counter and a column counter which generated the H.S. HSYNC and H.S. VSYNC signals used by the panel 16. The counters also control the retrieval of the video data from the enhancing unit 40, 42 and 44. In this regard, whenever the row counter reaches its terminal count, it generates the H.S. VSYNC signal. Similarly, whenever the column counter reaches its terminal count it generates the H.S. HSYNC signal. The video controller 18 is more fully described in copending U.S. patent application Ser. No. 07/586,506 and will not be described hereinafter in greater detail except with relation to the INTERRUPT program 1100. More particularly, as video data is loaded into each respective SAM of the enhancing units 40, 42 and 44 on a line by line basis, it should be understood that cooperation is required between the format timing generator 45 and its formatting of data for storage into the enhancing units 40, 42 and 44, and the video controller 18 and its reading of the formatted data from the bit map memory in the enhancing units 40, 42 and 44. The above-mentioned cooperation or handshaking is accomplished through the INTERRUPT firmware program 1100.

Considering now the INTERRUPT program 1100 in greater detail with reference to FIGS. 4 and 11, whenever the video controller 18 requires video data for display purposes, the video controller 18 generates an interrupt control signal on the request new data line buss between the video controller 18 and the memory controller 50. The interrupt control signal starts the INTERRUPT firmware program 1100. In this regard, the INTERRUPT firmware program 1100 starts at box 1101 and advances to instruction box 1103 which halts or interrupts the storing of data into the bit map memories of the enhancing units 40, 42 and 44. The program then advances to instruction box 1105 which enables the memory address lines from the row counter in the video controller 18 to be placed on the address buss for the enhancing units 40, 42 and 44. The address buss for the enhancing units 40, 42 and 44 is a common address buss shared by the format timing generator memory addressing and the video controller memory addressing.

After the memory address lines have been enabled, the memory controller 50 generates the RAS signal at instruction box 1107 transferring the row counter into the VRAMs or bit map memories of the enhancing units 40, 42 and 44. The program then advances to instruction box 1109 which disables the memory address buss from being controlled by video controller 18. The program then proceeds to instruction box 1111 and outputs all zeros onto the address buss via the memory controller 50. The program then goes to instruction 1113 where the memory controller enables the CAS signal to cause the column position to be coupled to the bit map memories of the enhancing units 40, 42 and 44. The program then proceeds to instruction 1115 and loads the video data into the respective SAMs, of the bit map memories in each enhancing unit 40, 42 and 44 for access by the video controller 18. In this regard, it should be understood that an entire row of video data is loaded into the respective SAMs for display purposes. After the video data has been loaded into the SAMs, the program advances to instruction 1117 to acknowledge that the loading of the SAM has been completed which is indicative that a new line of data may now be displayed on the high speed active matrix panel 16. More particularly, the H.S. HSYNC produced by the column counter is driven to a logical low level and remains low until the column counter in the video controller 18 reaches its terminal count indicating that another new line of video data is required. When another line of data is required, another interrupt signal is generated. It should be understood that when the request new data signal is generated by the video controller 18, the H.S. HSYNC goes to an active level.

After the acknowledgement of loading the SAMs is completed, the program goes to instruction 1119 which returns control of the memory address buss to the format timing generator 45. The program then advances to instruction 1121 which enables the row and column count in the format timing generator 45 to be set as previously described. The program then proceeds to box 1123 which causes the FORMAT program 700 to be resumed from where it was interrupted.

While the preferred embodiment of the present invention is shown as adapted for use with a conventional overhead projector it will be understood by those skilled in the art that other types of photographic projector systems, could also be used with the present inventive system.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A high speed color display unit for interfacing one of a plurality of video signal producing devices with a high speed display, said devices generating different types of video signals including a television signal and a computer video signal, comprising:
   microprocessor means for selecting a desired one of said plurality of video signal producing devices to be interfaced with the high speed display;
   signal conversion means responsive to the television signal for producing an analog signal indicative of a plurality of pixel images arranged in successive frames of full color video images;
   analog to digital conversion multiplexing means responsive to said microprocessor means for converting selectively the signal from the desired one of the video signal producing devices into a plurality of pixel image digital signals indicative of the full color video images each one of said pixel image digital signals having N bits of digital information;
   quantizing means responsive to said plurality of pixel image digital signals for quantizing said pixel image digital signals without introducing any substantial quantization errors, said digital signals being quantized into averaged pixel color shading level signals having M bits of digital information, where M is substantially smaller than N;
   bit map memory means for storing the quantized pixel image digital signals temporarily;

means for generating pixel clock signals, said pixel clock signals having a predetermined high rate, where said high rate is a sufficient pixel clock rate for the high speed display device;

means responsive to the pixel clock signals for retrieving the quantized pixel image digital signals;

signal generator means responsive to said pixel clock signals for producing a series of color shading level averaging signals arranged in recurring groups of said color shading level averaging signals; and means of comparing individual ones of the retrieved quantized pixel image digital signals and individual corresponding ones of said color shading level averaging signals to develop an output signal to cause the high speed display device to produce individual ones of said plurality of pixel images whenever the value of the quantized pixel image digital signal is at least equal to the value of said corresponding color shading level averaging signal, whereby the average intensity level for each pixel image over a large number of successive frames closely approximates a desired pixel image shading level without introducing any substantial contouring or flicker.

2. A high speed color display unit according to claim 1, further comprising:

scaling means for substantially eliminating extraneous beat patterns and flicker in said full color displayable images.

3. A high speed display unit as recited in claim 1 wherein said high speed display is a high speed active matrix display.

4. A high speed display unit as recited in claim 3, wherein said active matrix display is an active matrix thin film transistor liquid crystal display panel.

5. A high speed display unit as recited in claim 4, wherein said display panel includes a matrix of electronically operable pixel elements, each one of said pixel elements having a set of three subpixel components.

6. A high speed display unit as recited in claim 5, wherein each subpixel component is indicative of a different primary color for producing a large number of color shades by a color additive process as each subpixel component is driven on and off by said output signal.

7. A high speed display unit as recited in claim 5, wherein each subpixel component is indicative of a different complementary primary color for producing a large number of color shades by a color subtractive process as each subpixel component is driven off and on by said output signal.

8. A color display system for use with a computer device, and a plurality of television formatted signal producing devices, comprising:

display means for displaying a color image;

multiple video signal receiving means for receiving a plurality of television formatted video signals produced by the plurality of television formatted signal producing devices;

controller means responsive to said multiple-video signal receiving means or the computer device for selecting a desired one of the plurality of television formatted signal producing devices or the computer device to be coupled to said display means;

said controller means including multiplexor means for selectively coupling the selected device to said display means;

said controller means including means responsive to the selected device for generating a plurality of video clock signals having a predetermined low rate and a plurality of pixel shading level signals, each pixel shading level signal having N bits of digital information;

said controller means further including signal generator means responsive to individual ones of the video clock signals having a predetermined low rate for producing a series of pixel color averaging signals arranged in recurring groups, and means for comparing individual ones of said pixel color averaging signals with corresponding ones of said pixel shading level signals to generate contouring eliminating signals whenever individual ones of said pixel shading level signals are at least equal to corresponding ones of said pixel color averaging signals to substantially eliminate contouring in a displayed video image having a plurality of different shading levels of the same primary color;

each one of said contouring eliminating signals having M bits of digital information, where M is substantially less than N;

bit map memory means for storing said contouring eliminating signals temporarily;

means for generating pixel clock signals, said pixel clock signals having a predetermined high rate, where said high rate is substantially greater than said low rate;

means responsive to said pixel clock signal for generating a series of modulating signals arranged in recurring groups; and scaling means for comparing individual ones of said stored contouring eliminating signals with corresponding individual ones of said modulating signals for generating modulated contouring eliminating signals for substantially eliminating extraneous beat patterns and flicker in said color image.

9. A color display system as recited in claim 8, wherein said multiplexor means includes:

analog to digital conversion means responsive to said multiple-video signal receiving means for converting a selected one of said plurality of television formatted video signals into a plurality of digital signals;

buffer means for temporarily storing said plurality of digital signals for quantizing purposes; and duty cycle means coupled to said buffer means for quantizing said plurality of digital signals without introducing any substantial quantization errors.

* * * * *

UNITED STATES PATENT AND TRADEMARK OFFICE
CERTIFICATE OF CORRECTION

| | |
|---|---|
| PATENT NO. | : 5,276,436 |
| APPLICATION NO. | : 07/616178 |
| DATED | : January 4, 1994 |
| INVENTOR(S) | : Robert W. Shaw et al. |

It is certified that error appears in the above-identified patent and that said Letters Patent is hereby corrected as shown below:

Column 1
Lines 19-20, "...SAME," now abandoned, which is a continuation-in-part and of U.S. patent application Ser. No. 07/506,621..." -- should read --...SAME," now abandoned, and of U.S. patent application Ser. No. 07/506,621...--.

Signed and Sealed this

Third Day of November, 2009

David J. Kappos
*Director of the United States Patent and Trademark Office*